3,654,355
PROCESS OF PREPARING ADIPIC ACID BY THE NITRIC ACID OXIDATION OF CYCLOHEXANE

Werner H. Mueller, Gulf Breeze, and Charles R. Campbell and John J. Hicks, Jr., Pensacola, Fla., assignors to Monsanto Company, St. Louis, Mo.
No Drawing. Filed Nov. 19, 1969, Ser. No. 878,239
Int. Cl. C07c 55/04, 55/14
U.S. Cl. 260—533 C          8 Claims

ABSTRACT OF THE DISCLOSURE

In processes for the production of adipic acid by the oxidation of cyclohexane in the liquid phase with aqueous nitric acid at temperatures between 70° and 130° C. wherein a vanadium catalyst is employed and wherein the oxidation is conducted in the presence of an organic nitro-compound which is a solvent for the cyclohexane, substantial increases in the yield and production rate of adipic acid and substantial decreases in the formation of nitrated by-products are attained without a substantial increase in nitric acid consumption by introducing from about 0.2 to 5.0 moles of nitric oxide into the reacting mixture per mole of cyclohexane introduced.

BACKGROUND OF THE INVENTION

It is known that cycohexane, when treated with aqueous nitric acid in the liquid phase, is converted to nitrocyclohexane and adipic acid according to a free radical mechanism in which radical-like nitrogen dioxide molecules (supplied by the nitric acid) first react with cyclohexane to form the cyclohexyl radical and then with this radical to form simultaneously adipic acid and nitrocyclohexane. In U.S. Pat. 3,306,932 an improvement in the preparation of adipic acid by processes involving this reaction is described. The improvement consists of conducting the reaction in the presence of an added organic nitro-compound that is a solvent for cyclohexane, e.g., nitrocyclohexane. The patentee found that in the presence of the nitro-compound the reaction by which cyclohexane is converted to nitrocyclohexane tends to be blocked. As a result, a larger portion of the cyclohexane is converted to adipic acid and less nitric acid is consumed in the formation of undesirable by-products, i.e., nitrocyclohexane. However, even by utilizing this improvement substantial amounts of the nitric acid and cyclohexane introduced into the reaction are nevertheless converted to nitrocyclohexane and various dinitrocyclohexanes which are not readily convertible in any appreciable yield to adipic acid.

An object of the present invention, therefore, is to provide yet a further improvement in processes of the type just described whereby reductions in the formation of nitrocyclohexanes and increases in the yield and rate of production of adipic acid are attained without a substantial increase in the nitric acid consumption.

SUMMARY OF THE INVENTION

In accordance wtih the object of the present invention, it has been discovered that in continuous processes for the production of adipic acid by the oxidation of cyclohexane with an aqueous solution of 35% to 80% by weight nitric acid in the presence of a vanadium catalyst and an organic nitro-compound that is a solvent for cyclohexane a substantial increase in the yield and rate of production of adipic acid and a substantial reduction in the yield of nitrated products are attained without substantially increasing the nitric acid consumption by introducing nitric oxide (NO) into the reacting mixture.

The present invention may be characterized as an improvement in processes of the type described in U.S. Pat. 3,306,932, wherein the improvement is accomplished by introducing NO into the reacting mixture.

Heretofore, it had been generally accepted that in processes of the type under consideration the presence of NO in the reacting mixture represented an undesirable condition for at least two reasons: (1) NO is formed by the partial reduction of $NO_2$ and therefore represents a loss of reactant and (2) NO transforms itself into $N_2$ and $N_2O$, which are not recoverable as nitric acid and thus are lost. In the prior art, therefore, it has been suggested to introduce oxygen or air into the reacting mixture to convert NO as it is formed to $NO_2$ and thereby prevent $N_2$ and $N_2O$ formation and $NO_2$ losses. It was therefore wholly unexpected to discover that the introduction of a limited amount of NO into the reacting mixture resulted in an increase in the yield and production rate of adipic acid and a reduction in the yield of nitrated products, e.g., nitrocyclohexane, without a substantial increase in nitric acid consumption per gram of adipic acid produced. Additionally, it was discovered that the introduction of oxygen into the reacting mixture resulted in an increase in by-product dibasic acids, especially succinic acid (about a fourfold increase) and a considerable decrease in reaction rate, i.e., a four- to fivefold decrease.

A possible explanation for the foregoing discoveries may be that a limited amount of NO is essential to the oxidation reaction as illustrated by the following equations:

(1) 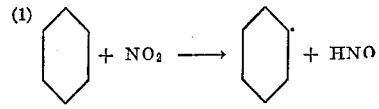

(2) $2HNO_2 \rightarrow NO + NO_2 + H_2O$ (3) $NO + 2HNO_3 \rightleftharpoons 3NO_2 + H_2O$ (4) $NO + 1/2 O_2 \rightarrow NO_2$ It can be seen from Equation 3 that in the absence of NO, $NO_2$ goes to $HNO_3$ since the equilibrium is then shifted to the left. It is well established that nitric acid, per se, does not attack paraffins (e.g. cyclohexane) even at temperatures of 150° C.; nitric acid serves only as a source for the radical-like $NO_2$ molecules. It is also possible that NO may react with the cyclohexyl radical to form adipic acid according to the following equation:

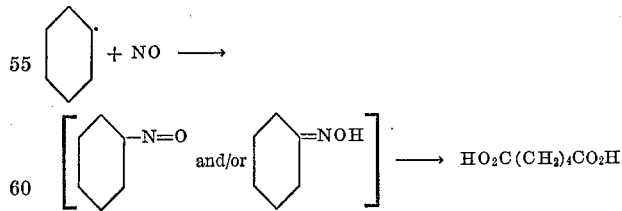

DESCRIPTION OF THE PREFERRED EMBODIMENTS

The reaction conditions employed in the oxidation of cyclohexane in the liquid phase with aqueous nitric acid in the presence of a vanadium catalyst are well-known in the prior art; processes wherein the oxidation is conducted in the presence of an organic nitro-compound which is a solvent for cyclohexane are described in U.S. Pat. 3,306,932. The presence of the organic nitro-compound does not alter the general reaction conditions of the process. The preferred organic nitro-compounds used in carrying out the process are nitrocyclohexanes since these compounds can be formed in situ and are produced to some extent by the process. Accordingly, the process has been described herein using nitrocyclohexanes as the selected organic nitro-compound.

The process of the invention is preferably carried out by a continuous operation in a pass-through reactor wherein at steady state conditions feed materials are continuosly introduced into the reactor at a constant rate while the products are simultaneously removed therefrom at a rate such that the liquid level in the reactor is maintained at a fixed value. The expression "steady state conditions" is used herein in its usual sense and denotes that the composition of the reacting mixture is substantially constant. Steady state conditions are attained by initially charging the reactor with the desired volume of feed materials, i.e., cyclohexane, vanadium catalyst, nitrocyclohexane and a molar excess, based on cyclohexane, of 30% to 80% by weight $NHO_3$ in water. The feed materials are then heated to the desired operating temperature, i.e., 70° to 130° C. and the pressure is allowed to reach the desired operating pressure, i.e., sufficient pressure to maintain the cyclohexane in the liquid state, e.g., 40 to 1000 p.s.i.a. After the desired operating conditions are reached, feed materials are pumped into the reactor and products withdrawn as indicated above. The reaction time or holdup time is a function of pumping rate. Products are recovered from the reacting mixture by withdrawing a portion thereof which is composed of an organic phase and an aqueous phase, the latter containing adipic acid and by-product dibasic acids such as succinic and glutaric acids. The organic phase contains unreacted cyclohexane and nitrocyclohexane. Nitrated by-products such as 1,1- and 1,3- and 1,4-dinitrocyclohexanes and 1-nitrocyclohexene are distributed between the two phases according to their solubilities. Preferably, after separation of the dibasic acids, usually by crystallization, the remainder of the liquid materials withdrawn from the reactor are recycled. Recycling of the materials, of course, substantially reduces the amount of fresh feed materials required. If the reactor is equipped with internal decanting means, it is possible to withdraw substantially only an aqueous solution containing the adipic acid. In this instance nitrocycolhexane is not fed into the reactor at steady state conditions since the concentration thereof in the reacting mixture is substantially constant. The process should be carried out in an atmosphere of nitrogen to avoid the possibility of explosive conditions.

At steady state conditions the reacting mixture comprises, exclusive of products, an organic phase consisting of cyclohexane and nitrocyclohexane in a weight ratio of from 60:40 to 5:95, respectively, and an aqueous phase consisting of vanadium catalyst and from 30% to 80% by weight on an aqueous basis of nitric acid, wherein a molar excess of nitric acid to cyclohexane is present. The composition of the reacting mixture will vary within the indicated ranges depending upon the proportions of feed materials added and reaction conditions.

The improvement of the present invention is carried out by introducing NO into the reacting mixture at steady state conditions. This may easily be accomplished by sparging NO upwardly through the reacting mixture. The amount of NO introduced into the reacting mixture preferably ranges from 0.2 to about 5 moles per mole of cyclohexane introduced into the reacting mixture at steady state conditions. The introduction of less than 0.2 mole NO per mole of cyclohexane does not result in an appreciable increase in the yield or production rate of adipic acid. On the other hand, when more than about 5 moles NO per mole of cyclohexane are introduced into the reacting mixture the increase in the yield and production rate of adipic acid is offset by the increase in the nitric acid consumption (grams of nitric acid consumed per gram of adipic acid produced).

The process is optimumly carried out under the following conditions:

Catalyst—0.3% b ywt. V and 0.5% by wt. Cu (based on the aqueous phase)
Temperature—110–120° C.
Pressure—150–350 p.s.i.g.
$HNO_3$ concentration (percent) by weight on aqueous basis)—50%–60%
Weight ratio of cyclohexane to nitrocyclohexane—60:40–5:95
Molar excess of $HNO_3$ to cyclohexane—2–60 moles
Reaction time—30 to 90 minutes
NO feed—0.2 to 5.0 moles/mole cyclohexane It is essential that the reaction be carried out in the presence of vanadium, as catalyst. The vanadium is generally added in the form of a water soluble salt, e.g., ammonium vanadate, sodium vanadate, vanadyl nitrate, vanadyl sulfate, etc. The vanadium catalyst directs the reaction to produce a maximum amount of adipic acid and minimizes degradation to lower carboxylic acids. Copper has been found to be beneficial in increasing reaction rate and improving product distribution and may be used in combination with vanadium. Copper can be added as metal (which is then converted to the nitrate), as copper oxide, as copper salts (acetate, nitrate, sulfate, etc.) or as complexes such as cuprammonium acetate. The catalysts are preferably added to the reaction along with the aqueous nitric acid in amounts ranging from about 0.05 to 0.5% by weight vanadium and from about 0.1 to 1.0% by weight copper.

The following examples are intended to illustrate the invention, without intent to thereby limit its scope.

Example 1

To a pass-through autoclave equipped with stirring means there was added an initial charge of 496.4 grams of nitric acid feed material consisting of 59 weight percent aqueous nitric acid containing 0.5% Cu and 0.3 v. percent and 124.5 grams of organic feed consisting of 49.5 weight percent nitrocyclohexane, 0.5% dinitrocyclohexanes (DNCH) (mainly 1,1-dinitrocyclohexane) and 50 weight percent cyclohexane. The reactor was pressurized with nitrogen to 350 p.s.i.g. and the contents thereof heated within 25 minutes to 110° C. while the reaction mixture was vigorously stirred. The reaction mixture was kept at 110° C. for 10 minutes. The feed pumps were then started, pumping 12.10 mls./min. of said nitric acid feed material and 4.63 mls./min. of said organic feed into the reactor, while nitric oxide was sparged through the reaction mixture at the rate of 0.1 liter (14.7 p.s.i.g., 70° F.) per minute briefly at the outset and then increased over a fifteen minute period to 0.4 liter/mni. The average residence time at these feed rates was 30 minutes. The pressure was held constant at 350 p.s.i.g. by bleeding off gas. Over a period of 4.5 hours 4465.4 grams of nitric acid feed material and 1116.2 grams of organic feed material were delivered to the reactor. Under these conditions the nitric acid concentration in the aqueous phase was 51% and the oil phase contained 64% by weight of nitro-cyclchexane, 33.5% by weight cyclohexane and 2.5% by weight higher nitrated products. The liquid stream leaving the reactor plus the product remaining in the reactor after termination of the experiment contained 300.9 grams of adipic acid, 28.27 grams of glutaric acid, 14.9 grams of succinic acid and 642.16 grams of nitrocyclohexane and 19 grams of nitrated by-products (1,1- and 1,3- and 1,4-dinitrocyclohexanes and 1-nitrocyclohexene) distributed between the two liquid phases according to their solubilities. The total cyclohexane converted was 226.3 grams (35.6%) of which 76.5% converted to adipic acid, 7.9% to glutaric, 4.7% to succinic, 8% to nitrocyclohexane and 2.9% to dinitrocyclohexanes.

Example 2

This example illustrates the beneficial results attained by sparging nitric oxide through the reaction mixture. Two experiments, A and B, were conducted under identical conditions except that in experiment B nitric oxide was introduced into the reaction mixture. Both experiments were run continuously for 12 hours. In each experiment the product was separately collected and analyzed for each two-hour period (four turnovers of reactor materials) of the 12-hour run. Thus, six analyses were made for each of the twelve-hour runs, i.e., an analysis was made of products formed during the 0–2 hour period; a second analysis was made of products formed during the 2–4 hour period, etc. Both experiments were carried out according to the procedure of Example 1 under the following reaction conditions:

Nitric acid feed material (NAFM) consisted of aqueous nitric acid (60 weight percent concentration) containing 0.5% copper and 0.3% vanadium catalysts.
Organic feed material (OFM) consisted of 50 weight percent cyclohexane and 50 weight percent nitrocyclohexane.
NAFM/OFM was 4/1 by weight.
Residence time of materials in reactor was 30 minutes.
Nitrogen purge was 3 liters/min.
Reaction volume was 0.5 liter.
Reaction temperature was 108° C.
Pressure was 200 p.s.i.g.

The results of the experiments are given in the table below in which the following abbreviations are used:

Ad=adipic acid
Gl=glutaric acid
Su=succinic acid
ANE=cyclohexane
NCH=nitrocyclohexane
DNCH=dinitrocyclohexanes
L=liters
Aq=aqueous
$t_1$=0 to 2 hour period
$t_2$=2 to 4 hour period
$t_3$=4 to 6 hour period
$t_4$=6 to 8 hour period
$t_5$=8 to 10 hour period
$t_6$=10 to 12 hour period In the examples the materials withdrawn from the autoclave were all collected and combined in order that an accurate analysis of the reaction could be made. In practice, however, it is desirable to recycle nitric acid, cyclohexane, nitrocyclohexane and nitric oxide and thereby increase the overall economics and efficiency of the process. It will be observed from the table that very little nitrocyclohexane is produced at steady state conditions. Thus, the required concentration of nitrocyclohexanes in the oil phase of the reaction mixture can be easily controlled by means of recycle. Although, as described in the prior art, organic nitro-compounds other than nitrocyclohexane may be used as a solvent for the cyclohexane, it is preferable to employ nitrocyclohexane since it is formed in situ in the reaction to a degree depending on the concentration thereof in the reaction mixture. Other nitroorganic compounds which can be employed include the nitroalkanes, nitrocycloalkanes, nitrobenzene, nitrocarboxylic acids and precursors of nitrocarboxylic acids.

What is claimed is:

1. In a continuous process for the production of adipic acid by the nitric acid oxidation of cyclohexane in the liquid phase at a temperature between 70° and 130° C. of the type where the oxidation is conducted in the presence of nitrocyclohexane and where an aqueous solution of 35 to 80% by weight nitric acid containing from 0.05 to 0.5 weight percent, as vanadium, of a dissolved vanadium compound and cyclohexane are continuously added to a pass-through reactor to provide a reaction mixture comprising at steady state conditions a molar excess of nitric acid to cyclohexane and a weight ratio of cyclohexane to nitrocyclohexane of from 60:40 to 5:95, and where a portion of the reaction mixture is continuously withdrawn from said reactor at steady state conditions in an amount sufficient to maintain a substantially constant volume of liquid materials in the reactor, the improvement of introducing into the reaction mixture from 0.2 to 5 moles of nitric oxide per mole of cyclohexane added ot the reaction mixture while operating at steady state conditions.

2. The process of claim 1 wherein the weight ratio of cyclohexane to nitrocyclohexane is from 60:40 to 30:70.

3. The process of claim 2 wherein the reacting mixture contains from 2 to 60 moles of nitric acid per mole of cyclohexane.

4. The process of claim 3 wherein the aqueous solution of nitric acid also contains from 0.1 to 1 weight percent, as copper, of a dissolved copper compound.

TABLE —RESULTS

| Experiment and time period of— | NO (l./min.) | G. Ad/l. hr. | G. NCH/l. hr. | Ad/ANE, lbs./lb. | Gl/ANE, lbs./lb. | Su/ANE, lbs./lb. | NCH/ANE, lbs./lb. | DNCH/ANE, lbs./lb. | HNO$_3$/Ad, lbs./lb. | Steady state HNO$_3$, percent in Aq. phase | ANE conversion, percent |
|---|---|---|---|---|---|---|---|---|---|---|---|
| A-$t_1$ | | 76.5 | 23.4 | 1.04 | 0.09 | 0.05 | 0.32 | 0.19 | | 51.3 | 31.6 |
| A-$t_2$ | | 86.8 | 23.4 | 1.09 | 0.09 | 0.06 | 0.29 | 0.18 | | 49.3 | 34.2 |
| A-$t_3$ | | 85.9 | 23.0 | 1.09 | 0.10 | 0.06 | 0.29 | 0.18 | | 49.3 | 33.9 |
| A-$t_4$ | | 83.4 | 21.1 | 1.10 | 0.10 | 0.05 | 0.28 | 0.19 | 1.47 | 49.7 | 30.9 |
| A-$t_5$ | | 83.0 | 21.5 | 1.10 | 0.09 | 0.05 | 0.28 | 0.19 | | 49.5 | 30.8 |
| A-$t_6$ | | 83.2 | 20.9 | 1.10 | 0.09 | 0.05 | 0.28 | 0.18 | 1.35 | 49.5 | 30.6 |
| B-$t_1$ | 0.5 | 128.1 | 9.7 | 1.32 | 0.12 | 0.07 | 0.10 | 0.09 | | 46.3 | 39.8 |
| B-$t_2$ | 0.5 | 129.8 | 9.8 | 1.32 | 0.12 | 0.06 | 0.10 | 0.09 | | 44.9 | 40.6 |
| B-$t_3$ | 0.5 | 130.3 | 9.9 | 1.32 | 0.12 | 0.06 | 0.10 | 0.09 | 1.35 | 44.5 | 40.8 |
| B-$t_4$ | 0.5 | 128.5 | 9.7 | 1.33 | 0.12 | 0.06 | 0.10 | 0.09 | 1.40 | 44.9 | 39.9 |
| B-$t_5$ | 0.5 | 128.8 | 9.6 | 1.33 | 0.12 | 0.06 | 0.10 | 0.09 | | 44.5 | 40.2 |
| B-$t_6$ | 0.5 | 126.8 | 9.5 | 1.32 | 0.12 | 0.07 | 0.10 | 0.09 | | 44.9 | 39.8 |

The results in the table show that substantial benefits are attained by the introduction of a limited amount of nitric oxide into the reaction mixture. The adipic acid yield per pound of cyclohexane consumed was increased from 1.10 to 1.32; the rate of adipic acid produced per liter of reaction volume was increased from 83 grams to 129 grams; the yield of dinitrated products was decreased from 0.29 pound per pound of cyclohexane consumed to 0.10 pound; the yield of nitrocyclohexane was decreased from an average of 22.2 grams per liter hour to 9.7 grams; and the lbs. of nitric acid consumed per lb. of adipic acid produced was substantially unaffected.

5. The process of claim 4 wherein said portion of reacting mixture withdrawn from the reactor is separated into an organic layer and an aqueous phase and wherein said organic layer is recycled, adipic acid is crystallized from the aqueous phase and the aqueous HNO$_3$ mother liquor is recycled.

6. The process of claim 5 wherein the nitrocyclohexane is initially added as a feed material and at steady state conditions is added by means of recycle.

7. The process of claim 5 wherein the nitrocyclohexane is initially provided in the reacting mixture by generating it in situ and is provided at steady state conditions by means of recycle.

8. The process of claim 4 wherein said portion of reacting mixture withdrawn from the reactor is essentially of an aqueous solution.

References Cited

UNITED STATES PATENTS 3,306,932   2/1967   Davis _____ 260—533 C

FOREIGN PATENTS 969,793   9/1964   Great Britain _____ 260—533 C

JAMES A. PATTEN, Primary Examiner

R. D. KELLY, Assistant Examiner